June 14, 1932.  L. RAMSTHALER  1,863,069
FERRULE FOR TUBES
Filed Aug. 26, 1927
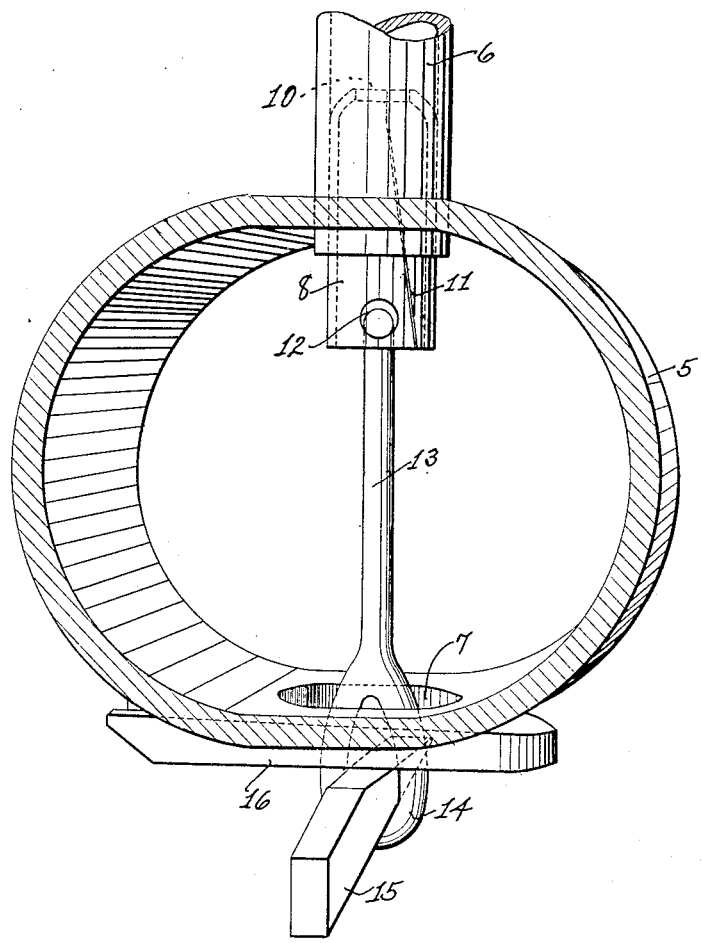
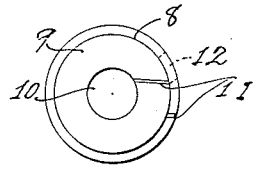 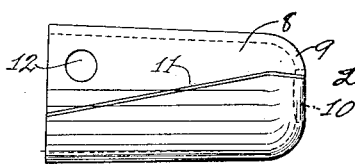
Louis Ramsthaler
INVENTOR
BY
Gifford & Scull
ATTORNEYS Patented June 14, 1932

1,863,069

UNITED STATES PATENT OFFICE

LOUIS RAMSTHALER, OF BARBERTON, OHIO, ASSIGNOR TO THE BABCOCK & WILCOX COMPANY, OF BAYONNE, NEW JERSEY, A CORPORATION OF NEW JERSEY

FERRULE FOR TUBES

Application filed August 26, 1927. Serial No. 215,744.

This invention relates to flexible ferrules that are especially useful for being inserted into the ends of superheater tubes to cause the correct distribution of steam through the tubes, but it is to be understood that the ferrules are not restricted to this particular purpose. The invention will be understood from the description in connection with the accompanying drawing in which Fig. 1 is a perspective view showing a section of a superheater header with a tube expanded into it; Fig. 2 is an end view of the ferrule; and Fig. 3 is a side view of the same. In the drawing, reference character 5 indicates a section of a superheater header that has a row of tubes expanded into it in the usual manner, one of the tubes being shown at 6. A handhole 7 is provided in the header 5 opposite the tube 6.

The ferrule 8, that is preferably made slightly tapered and having its wall of uniform thickness, has one end 9 swaged inwardly to leave a restricted opening 10 in the smaller end of the ferrule. A slot 11 extends from the opening 10 to the other end of the ferrule at an angle to the axis thereof. A hole 12 is provided through the wall near the larger end of the ferrule and close to the slot 11 to accommodate an instrument for withdrawing the ferrule.

A hook 13 is provided, one end of which can be inserted through the hole 12 and the other end is provided with a ring 14 through which a wedge 15 can be driven to pull the same longitudinally, a U-shaped cross piece 16 being interposed in front of the handhole 7 between the wedge 15 and the header 5.

The inside diameters of tubes vary slightly, and the ferrules are made of such a size that they will tightly fit the tubes of largest inner diameters. The ferrules are made of resilient material and are driven in place, thus partially or entirely causing the slot 11 to close and keeping the ferrules in firm frictional engagement with the insides of the tubes. When longitudinal force is exerted at the holes 12 for withdrawing the ferrules, it tends to cause the diameters of the ferrules to decrease, thus facilitating the withdrawal of the same from the tubes.

I claim:

1. A ferrule having a slot in one side with the central line of said slot at an angle to the axis of the ferrule and having one end thereof reduced in diameter, said ferrule having a hole through the wall thereof near said slot at its end opposite said reduced end.

2. A ferrule having a wall of substantially uniform thickness from one end to the other, said ferrule having a slot in one side with the center line of said slot at an angle to the axis of said ferrule, said ferrule having one end thereof reduced in diameter and having a hole through its wall near the other end.

3. A ferrule having a wall of substantially uniform thickness from one end to the other, said ferrule having a slot in one side with the center line of said slot at an angle to the axis of said ferrule, said ferrule having an opening in one end thereof smaller than the average internal diameter of said ferrule and having a hole through its wall near the other end.

4. A ferrule for a superheater tube having a slot in one side with the central line of said slot at an angle to the axis of the ferrule and having one end thereof reduced in diameter to form a restricted opening for the passage of steam, said ferrule having a hole through the wall thereof near said slot at its end opposite said reduced end.

5. A ferrule for a superheater tube having a wall of substantially uniform thickness from one end to the other, said ferrule having a slot in one side with the center line of said slot at an angle to the axis of said ferrule, said ferrule having one end thereof reduced in diameter to form a restricted opening for the passage of steam and having a hole through its wall near the other end.

6. A ferrule having a wall of substantially uniform thickness from one end to the other, said ferrule having a slot in one side with the center line of said slot at an angle to the axis of said ferrule, said ferrule having an opening in one end thereof smaller than the average internal diameter of said ferrule formed by metal of the ferrule at an angle to its longitudinal axis and having a hole through its wall near the other end.

LOUIS RAMSTHALER.